United States Patent [19]

Shimizu et al.

[11] 4,271,416

[45] Jun. 2, 1981

[54] SLIT TYPE INK RECORDING APPARATUS

[75] Inventors: Toshio Shimizu, Yokosuka; Susumu Ichinose, Yokohama; Yuji Ooba, Yokosuka, all of Japan

[73] Assignee: Nippon Telegraph and Telephone Public Corporation, Tokyo, Japan

[21] Appl. No.: 81,337

[22] Filed: Oct. 3, 1979

[30] Foreign Application Priority Data

| | | | |
|---|---|---|---|
| Oct. 18, 1978 | [JP] | Japan | 53-127412 |
| Jun. 15, 1979 | [JP] | Japan | 54-74700 |
| Jun. 22, 1979 | [JP] | Japan | 54-78094 |

[51] Int. Cl.³ .......... G01D 15/16
[52] U.S. Cl. .......... 346/140 R
[58] Field of Search .......... 346/140 R, 159

[56] References Cited

U.S. PATENT DOCUMENTS

| | | | |
|---|---|---|---|
| 2,143,376 | 1/1939 | Hansell | 346/140 R UX |
| 3,341,859 | 9/1967 | Adams | 346/140 R |
| 3,653,063 | 3/1972 | Miyazaki | 346/159 |
| 3,693,179 | 9/1972 | Skala | 346/140 R X |

*Primary Examiner*—George H. Miller, Jr
*Attorney, Agent, or Firm*—Burgess, Ryan and Wayne

[57] ABSTRACT

A recording head is provided with a slit-like issuing opening, and a plurality of divided electrodes which have a very small width are disposed in or adjacent to the slit-like issuing opening in very closely spaced apart relationship. An opposite electrode is disposed in front or back of a recording paper. The ink which is filled in the slit-like issuing opening and is adjacent to the divided electrode which is selected is emitted as a drop by the potential difference between the ink adjacent to said selected divided electrode and the opposite electrode.

12 Claims, 15 Drawing Figures

(a)

(b)

(a)

(b)

SLIT TYPE INK RECORDING APPARATUS

BACKGROUND OF THE INVENTION

The present invention relates to an ink-jet recording apparatus which has a slit-like ink issuing opening and is capable of flat-bed scanning.

Of the ink-jet recording apparatus of various types, one type is such that the ink drops are normally issued and only the ink drops which are required for recording are charged and deflected. In this ink-jet recording apparatus, the ink under pressure is supplied to a nozzle and a piezoelectric transducer mounted on the nozzle is driven at a high frequency so that the ink drops may be generated from the nozzle at the same frequency as the driving frequency. The ink drops are selectively charged in response to the character or pattern or image signal to be referred to as "the video signal" in this specification. The charged ink drop is deflected depending upon the charge on the drop when it passes through a pair of deflection electrodes and strikes against a recording paper, thereby forming a recording dot.

In the ink-jet recording apparatus with the above construction, the ink drops are always flying out and only the ink which is required for recording is charged and used for recording so that the ink which has not used for recording is recovered.

Another type of the ink-jet recording apparatus is such that a liquid chamber is provided at the rear of the nozzle of the ink-jet head and a piezoelectric transducer is located at the portion of the liquid chamber which is in opposed relationship with the nozzle or around the liquid chamber. In this ink-jet recording apparatus, when the voltage pulses are applied to the piezoelectric transducer, the volume of the liquid chamber is caused to rapidly contract, and the ink in the contracted volume flies our from the nozzle and strikes against the recording paper, thus forming a recording dot.

A further type of the ink-jet recording apparatus is such that a voltage is impressed between a nozzle filled with the ink and an electrode which is externally located so that the ink is drawn from the nozzle. This type of the ink-jet recording apparatus has the feature that the head is remarkably simple in construction and may be fabricated in a simple manner.

In the ink-jet recording apparatus of the types described above, only one nozzle is used for recording so that a mechanical horizontal scanning is required and consequently the apparatus has the defect that it is complex in construction. In order to render them into the electronic horizontal scanning apparatus, a large number of nozzles must be arrayed along a horizontal scanning. As a result, not only the fabrication of the apparatus is complicated but also there exists the defect that the degradation of reliability and maintainability due to the clogging of the nozzles is enhanced in proportion to the increase in number of nozzles.

SUMMARY OF THE INVENTION

Accordingly, one of the objects of the present invention is to provide a slit type ink recording apparatus which will not use a nozzle, is easy to fabricate and maintain and is highly reliable in operation.

Another object of the present invention is to provide a slit type ink recording apparatus in which a slit-like issuing opening is formed at right angles to the direction in which the recording paper is transported so that the electronic horizontal scanning may be effected.

The present invention comprises a head comprising a slit-like issuing opening connecting with an ink reservoir and a large number of divided electrodes of a very small width which are disposed adjacent to the issuing opening and are very closely arranged, and an opposite electrode located adjacent to the recording paper. One or more divided electrodes are selected, and a voltage is impressed between the opposite electrode and the ink so that the ink in the slit-like issuing opening adjacent to the divided electrode which is selected may be issued.

BRIEF DESCRIPTION OF THE DRAWINGS

FIG. 12(*b*) is a cross sectional view of a print head thereof; and

DESCRIPTION OF THE PREFERRED EMBODIMENTS

Figure 1:
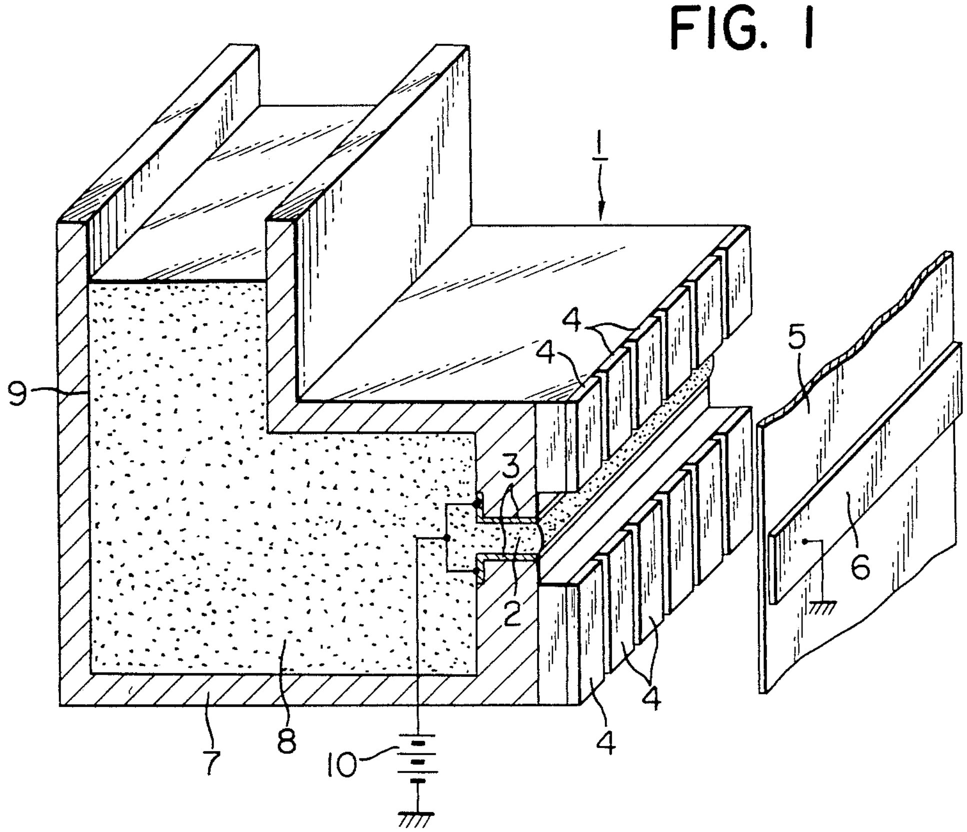
FIG. 1 is a perspective, vertical section of a first embodiment of a slit type recording apparatus in accordance with the present invention.

Referring to FIG. 1, a first embodiment of the present invention will be described in detail. In FIG. 1, high voltage electrodes 3 which are in contact with the ink are disposed in a slit-like nozzle 2 of a head 1, and a plurality of valving electrodes 4 with a very minute width are arranged adjacent to the nozzle 2 and are spaced apart from each other by a very close distance. An opposite electrode 6 is disposed behind a recording paper 5 in opposed relationship with the valving electrodes 4 and is grounded. The nozzle 2 of the head 1 is communicated with a liquid chamber 7 which is supplied with the ink 8 from an ink tank 9.

In the first embodiment with the above construction, in order to draw the ink 8 to the exterior to issue the ink 8, the high voltage of the order of 2 to 4 KV is applied to the electrodes 3 from a power source 10. When the high voltage is applied in the manner described above, the ink 8 is in the state of being drawn to the exterior, and when the voltage of the order of 0.5 to 1 KV is applied to the valving electrodes 4 under these conditions, the ink 8 is held at the nozzle 2. When one of the valving electrodes 4 is held at the same voltage as the opposite electrode 6, since the potential gradient required for flying the ink 8 is formed in the vicinity of the selected valving electrode 4, the ink 8 flies out from the position of the selected valving electrode 4. One or more valving electrodes 4 may be simultaneously selected depending upon the video signal, for recording. Therefore a multiple number of dots are simultaneously recorded so that there is an advantage that the recording speed is improved as compared with the case of using a single nozzle.

When more than two adjacent valving electrodes 4 are maintained at the same potential as the opposing electrode 6, the ink drops of the number corresponding to the selected valving electrodes 4 do not fly out, but only one drop flies out. In order to prevent this, it is required to operate the valving electrodes 4 which are spaced apart by such a distance that each ink drop may issue independently of each other. In order to accomplish this, it is required that even when the same scanning line is all black all of the valving electrodes 4 will not be simultaneously brought into the operative states, but a plurality of valving electrodes 4 which are spaced apart from each other by a required distance are operated so as to write a dotted line first and then in like manner a plurality of valving electrodes 4 which are spaced apart from each other by a required distance are operated so that white spots in said dotted line must be filled. Generally, the operation for filling the white spots may be accomplished by a few of said operations. This operation is valid in the embodiments to be described below.

Figure 2:
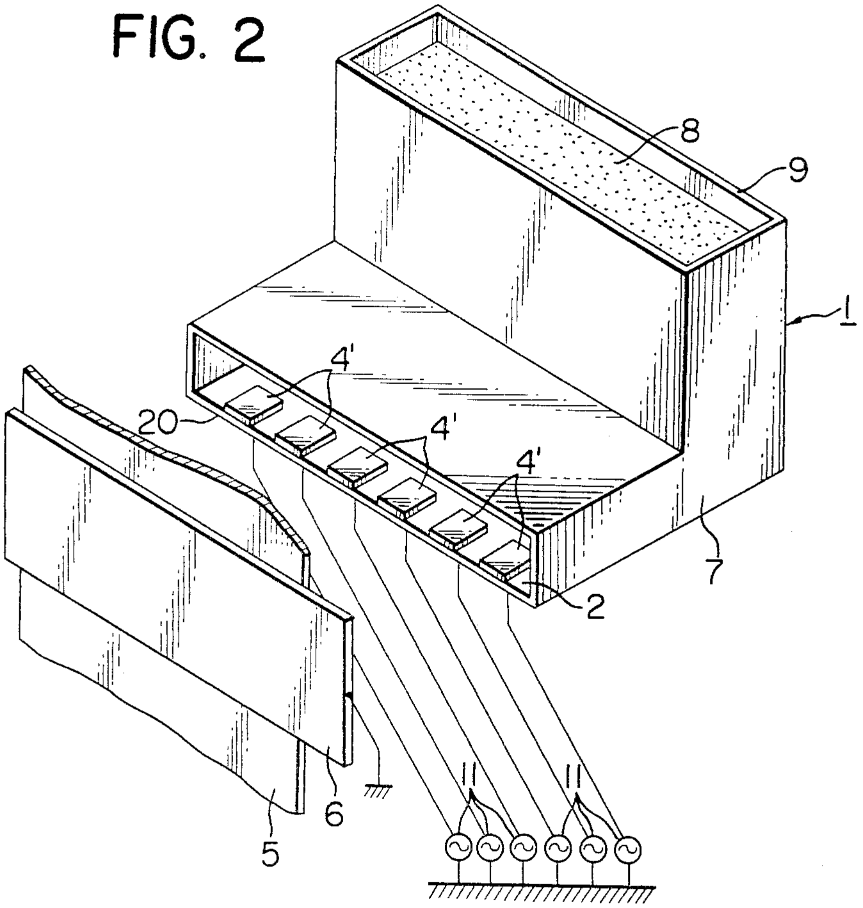
FIG. 2 is a perspective view of a second embodiment of the present invention.

Next, FIG. 2 shows a second embodiment of the present invention. In this embodiment, issuing electrodes 4' are located adjacent to the exit of the slit-like ink issuing opening 2 and are in contact with the ink 8 and connected to high voltage drivers 11 which are switched depending upon the video signal, and the high voltage electrodes 3 of the first embodiment are not provided. The high voltage driver 11 comprises a high voltage source, a circuit for distributing the video signal to each issuing electrode 4' and a driver for switching the high voltage.

The mode of operation of the second embodiment is substantially similar to that of the first embodiment except that the high voltage of from 2 to 4 KV is directly applied to the selected issuing electrodes 4'. The ink 8 adjacent to the selected and activated issuing electrodes 4' to which are applied the high voltage issues, and the issuing ink adheres to the recording paper 5 whereby the recording is effected. As with the first embodiment, it is possible to record even when a plurality of issuing electrodes 4' are simultaneously selected. In this case the issuing electrodes 4' are arranged on a bottom plate 20 which constitutes the slit-like issuing opening 2, but they may be arranged on the upper plate.

Figure 3:
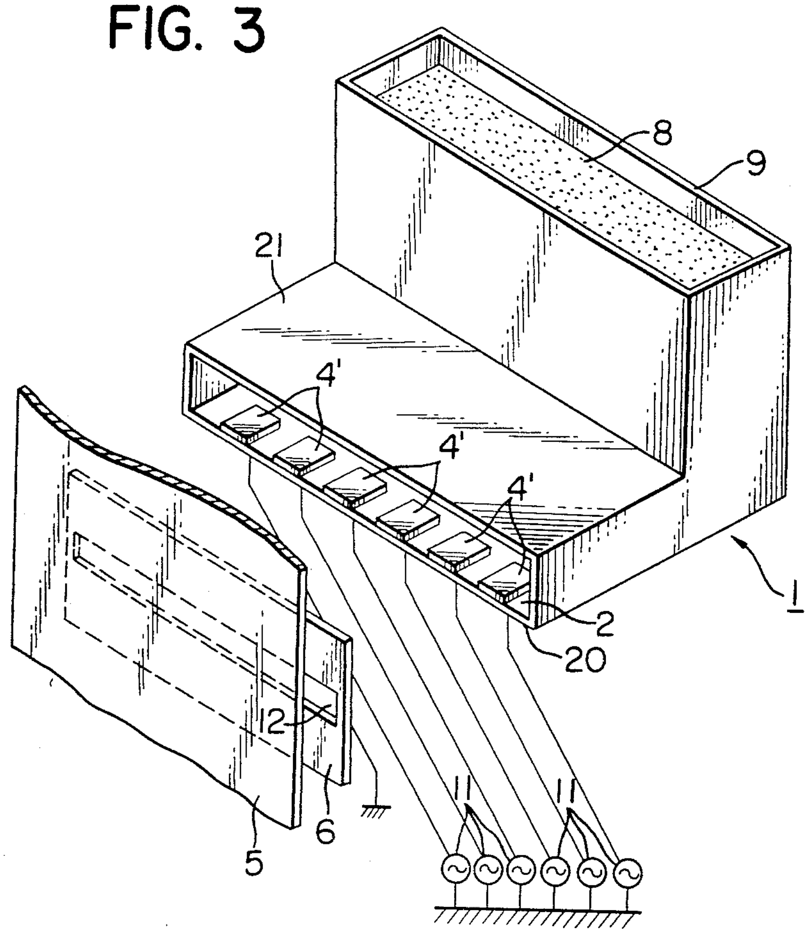
FIG. 3 is a perspective view of a third embodiment of the present invention.

FIG. 3 shows a third embodiment of the present invention. In the third embodiment the opposite electrode 6 is disposed in front of the recording paper 5, and this opposite electrode 6 is formed with a slit 12 through which the issuing ink drops pass.

In the third embodiment with the above construction the opposite electrode 6 may be regarded as a plate without the slit 12 when viewed from the issuing electrodes 4'. The issuing ink drops fly as if they would strike against the opposite electrode 6 and pass through the slit 12 and strike against the recording paper 5. Other arrangements and mode of operations are similar to those of the second embodiment so that they shall not be described.

Figure 4:
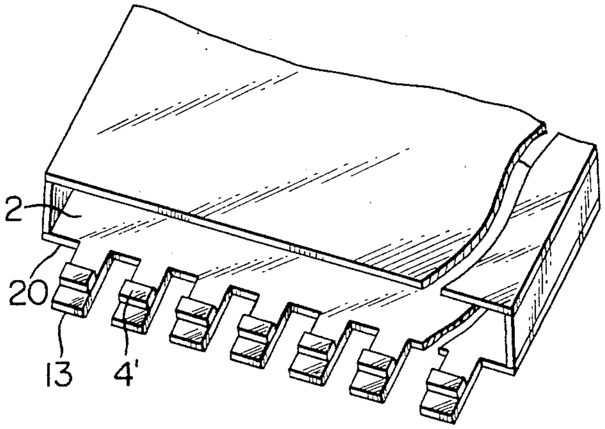
FIG. 4 is a fragmentary perspective view of a fourth embodiment of the present invention.

Next FIG. 4 shows a fourth embodiment of the present invention. In the fourth embodiment, the slit-like issuing opening 2 is formed with projections 13 of the same width as the issuing electrodes 4', and the issuing electrodes 4' are arranged on these projections 13.

In the fourth embodiment 4 with the above construction, when the ink 8 is poured, it is extended and held at the leading ends of the projections 13 because of the surface tension of the ink 8 so that the issuing of the ink 8 becomes easy.

In FIG. 4 the projections 13 are shown as extended from the bottom wall of the slit nozzle 2, but it is to be understood that they may be extended from the upper wall 21.

Figure 5:
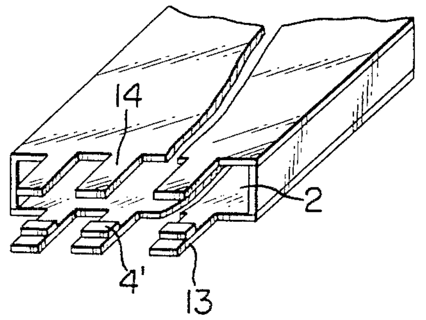
FIG. 5 is a fragmentary perspective view of a fifth embodiment of the present invention.

FIG. 5 shows a fifth embodiment of the present invention. In this embodiment, the projections 13 and 14 are formed both on the lower and upper plates 20 and 21 which constitute the slit-like issuing opening 2.

In this embodiment, the ink 8 is held at the leading ends of each pair of projections 13 and 14 so that the issuing of the ink 8 may become easy. The issuing electrodes 4' may be arranged on one or both of the projections 13 and 14.

Figure 6:
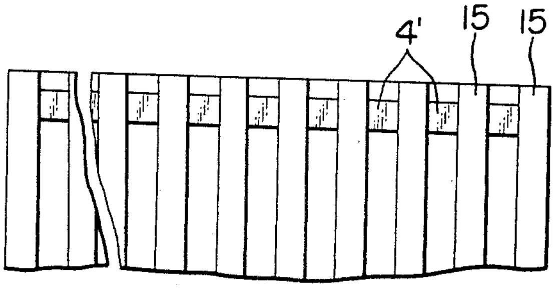
FIG. 6 is a top view of a lower plate of a slit-like ink issuing opening of a sixth embodiment of the present invention.

In FIG. 6 is shown a sixth embodiment of the present invention. Coating layers 15 formed from a material having no affinity with the ink 8 are formed on the upper and lower plates 21 and 20 which constitute the slit-like issuing opening 2, between the issuing electrodes 4' disposed in the vicinity of the slit-like issuing opening 2.

Figure 7:
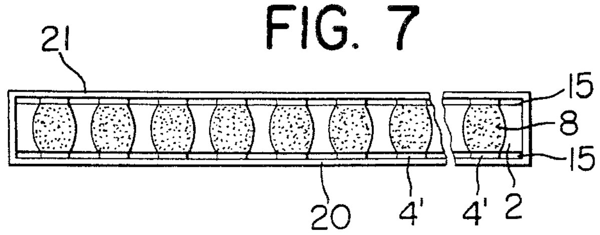
FIG. 7 is a front view thereof.

In the sixth embodiment with the above construction, the ink 8 has no affinity with the coating layers 15 so that as shown in FIG. 7 the ink 8 is concentrated and held in the vicinity of the issuing electrodes 4' so that the issuing of the ink drops may become easier as with the case of the fourth or fifth embodiment.

The coating layers 15 which have little or no affinity with the ink 8 may be formed only on the side of the issuing electrodes 4' or on the whole surface of the upper plate 21 which is not provided with the issuing electrodes 4'.

In the embodiments described above, only one opposite electrode 6 is provided, but it may be divided into a plurality of sections in a density lower than the density of the arrangement of the issuing electrodes 4'.

Figure 8:
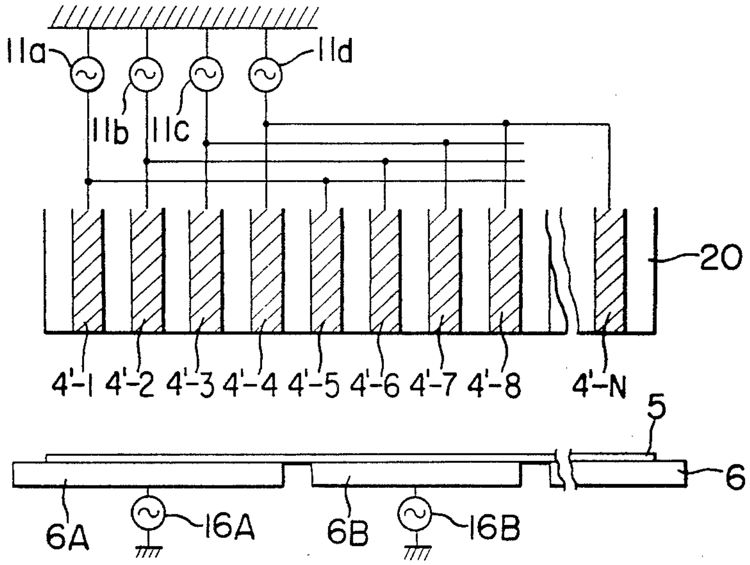
FIG. 8 shows the arrangement of electrodes in a seventh embodiment of the present invention.
Figure 9:
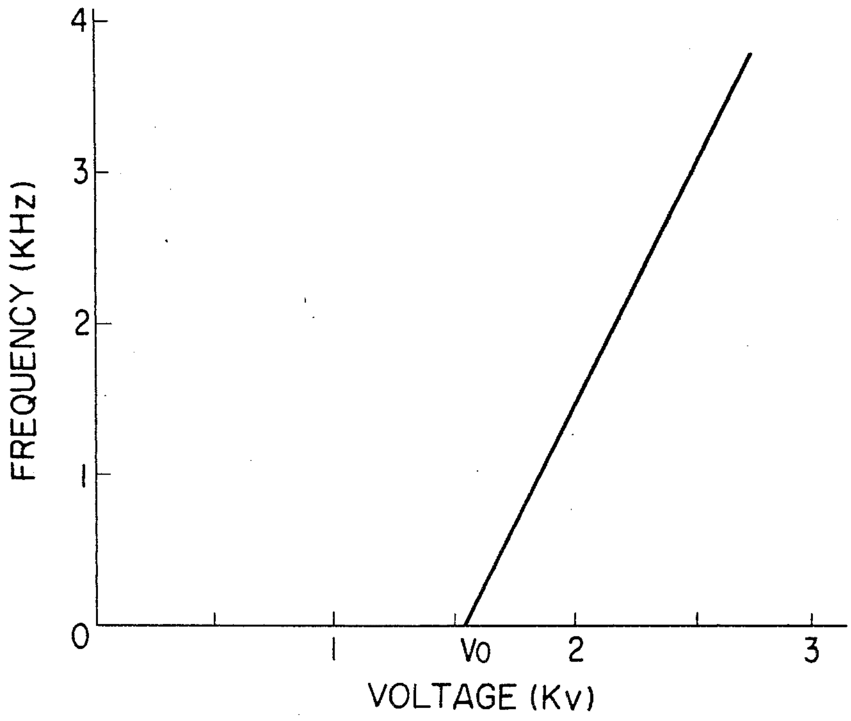
FIG. 9 shows the relationship between the ink drop frequency and the voltage.

FIG. 8 shows a seventh embodiment of the present invention wherein the opposite electrode 6 is divided. 20 is the lower plate which constitutes the slit-like issuing opening 2. 4' are the issuing electrodes. 5 is the recording paper. 6 is the opposite electrode. 11 is the high voltage pulse power source. This opposite electrode 6 is divided into a plurality of opposite electrodes 6A, 6B, and so on. They are connected to their respective control drivers 16A, 16B, and so on. Also the relationship between the voltage and the ink issuing frequency is shown in FIG. 9. This characteristic means that when the voltage of the ink at the slit-like issuing opening 2 is higher than Vo, the ink 8 issues from the slit-like issuing opening 2. Here the value of the voltage applied to the ink 8 is shown relative to the potential of the opposite electrode 6.

The high-voltage drivers **11*a*, 11*b*, 11*c* and 11*d* are connected to four issuing electrodes 4', respectively, from the left. That is, the high-voltage driver 11*a* is connected to the first issuing electrode 4'-1**, the fifth 4'-5, the ninth 4'-9 and so on. The high voltage driver 11*b* is connected to the second 4'-2, the 6-th 4'-6, the 10-th 4'-10 and so on. In like manner, the high voltage driver 11*c* is connected to the third, the 7-th, the 11-th and so on. The high-voltage driver 11*d* is connected to the fourth, the 8-th, the 12-th and so on. In this case, the number of the high voltage drivers 11 are four. Therefore, assuming that the total number of the issuing electrodes 4' be N, each of the high voltage drivers 11*a*, 11*b*, 11*c* and 11*d* is connected to at least N/4 issuing electrodes 4'. In general, assuming that the number of the high-voltage drivers 11 be m and the number of opposite electrodes 6 be n, it is required that $m \times n \geqq N$.

Next the mode of operation of the seventh embodiment will be described. When no recording is made, both the issuing electrodes 4' and the opposite electrodes 6 are maintained at the earth potential (=0 V). By the high-voltage driver 11*a*, the voltage of all of the issuing electrodes 4'-1, 4'-5, 4'-9 and so on which are connected to the high voltage driver 11*a* is made $+V_1$ $(0<V_1<V_0)$ while the voltage of the sectioned opposite electrode 6A is made to $-V_2$ $(0<V_2<V_0, V_1+V_2<V_0)$. Then only the issuing electrode 4'-1 has a potential difference higher than $V_0$ with respect to the sectioned opposite electrode 6A so that the ink adjacent to the issuing electrode 4'-1 issues through the slit-like ink issuing opening 2 and adheres to the recording paper, whereby the recording dot is formed. In this case, the voltage $V_1$ is applied to the issuing electrodes 4'-5, 4'-9 and so on, but their opposite electrodes 6B and so on are maintained at 0 V so that no ink issues from the vicinities of the issuing electrodes 4'-5, 4'-9 and so on. As a result, when the high voltage drivers 11*a*, 11*b*, 11*c* and 11*d* sequentially and selectively apply the pulse voltage $V_1$ to the issuing electrodes 4' and when the opposite electrodes which are driven to $-V_2$ are arbitrarily selected in response to the above operation, an arbitrary recording pattern may be obtained. When no recording is made, both the issuing electrodes 4' and their opposite electrodes 6A, 6B and so on need not to be maintained at 0 V. The values of $V_1$ and $V_2$ may be arbitrarily selected as far as the above operations may be satisfied.

For instance, when the ink is issued from all of the issuing electrodes 4', it is not needed to sequentially select the high voltage drivers 11*a*, 11*b*, 11*c* and 11*d*. In order to increase the recording speed, 11*a* and 11*c* are simultaneously selected so that recording may be made, and then 11*b* and 11*d* are selected so as to record on the same horizontal scanning line. Then the recording time may be reduced to one half. However, even in this case, it is required that the adjacent issuing electrodes 4' will not be selected at the same time.

Figure 10:
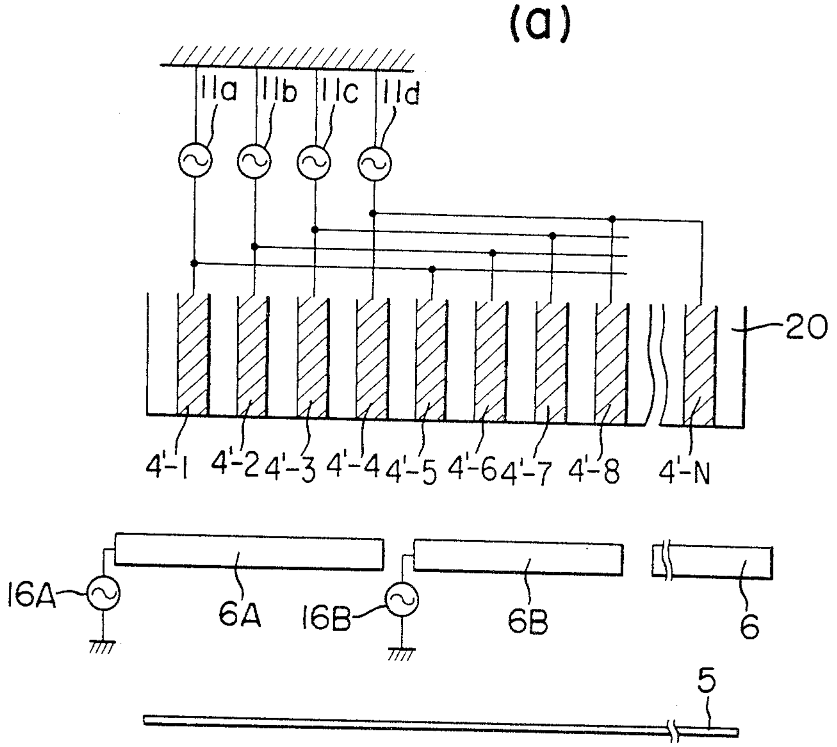
FIGS. 10(*a*) and (*b*) shows the arrangement of electrodes in an eighth embodiment of the present invention.
Figure 10:
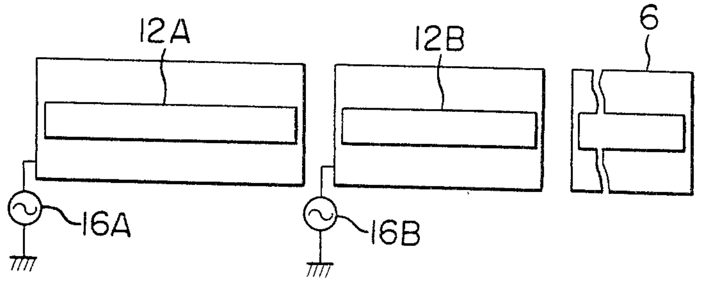

FIG. 10 shows an eighth embodiment of the present invention. In this embodiment, the opposite electrodes 6A, 6B and so on which are divided in the seventh embodiment are disposed in front of the recording paper 5 and formed with slits 12A, 12B and so on. The eighth embodiment is substantially similar in mode of operation to the seventh embodiment, and the opposite electrodes 6 operate on the same principle as the third embodiment.

The other opposite electrode may be provided in the back of the recording paper and the issuing ink drops passed through the slits of the opposite electrode may be accelarated by applying the electric potential smaller than $-V_2$ to the other opposite electrode.

Figure 11:
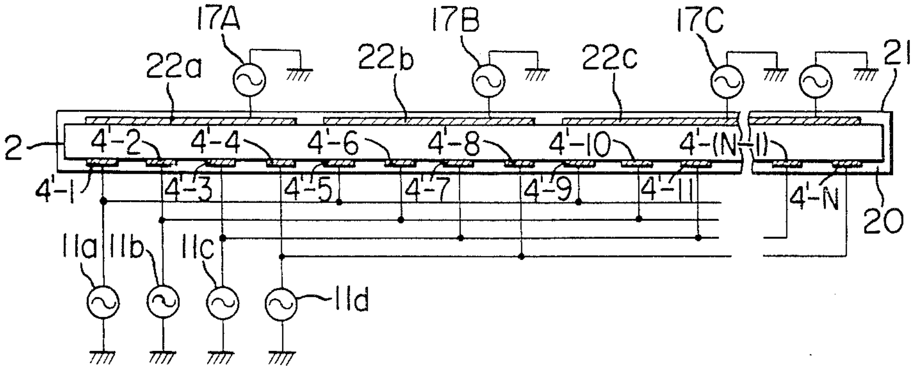
FIG. 11 shows the arrangement of a slit-like ink issuing opening and electrodes in a ninth embodiment of the present invention.

FIG. 11 shows a ninth embodiment of the present invention. In the seventh and eighth embodiments, the opposite electrode 6 which is disposed in front of or behind the recording paper 5 is divided, but in the ninth embodiment the issuing electrodes 4'-1, 4'-2, . . . , and 4'-N are mounted on the lower plate 20 while control electrodes 22*a*, 22*b*, 22*c* and so on are mounted on the upper plate 21 at such a density as lower than that of the issuing electrodes 4'-1 through 4'-N. In this ninth embodiment the high voltage driver 11*a* is caused to output an voltage higher than $V_0$ while the high voltage drivers 11*b*, 11*c* and 11*d* are caused to output a voltage less than $V_0$. The control driver 17A is caused to output a voltage higher than $V_0$ while the other control drivers, to output a voltage less than $V_0$. Then only the ink adjacent to the issuing electrode 4'-1 which is the leftmost is raised to a voltage higher than $V_0$ and issues from the ink issuing opening 2, adhering to the recording paper 5 and forming a recording dot. In order to issuing the ink by using the other issuing electrodes, the same procedures may be applied. It is of course necessary to dispose the opposite electrode 6 in front of or behind of the recording paper 5.

In the seventh, eighth and ninth embodiments, assume that a number of n divided or sectioned control or opposite electrodes are used and a number of m issuing electrodes 4' are disposed in opposed relationship with each of the divided or sectioned control or opposite electrodes. Then the total number of the high voltage drivers and the control drivers is $(m+n)$ so that the number of drivers may be reduced considerably as compared with the number of the issuing electrodes 4'.

In the embodiments described above, a metallic foil is adhered to the inside surface of the upper or lower plate 21 or 20, but in order to reduce the fabrication costs, a method for etching metallic foils or printing conductive materials may be employed as will be described in detail below.

Figure 12:
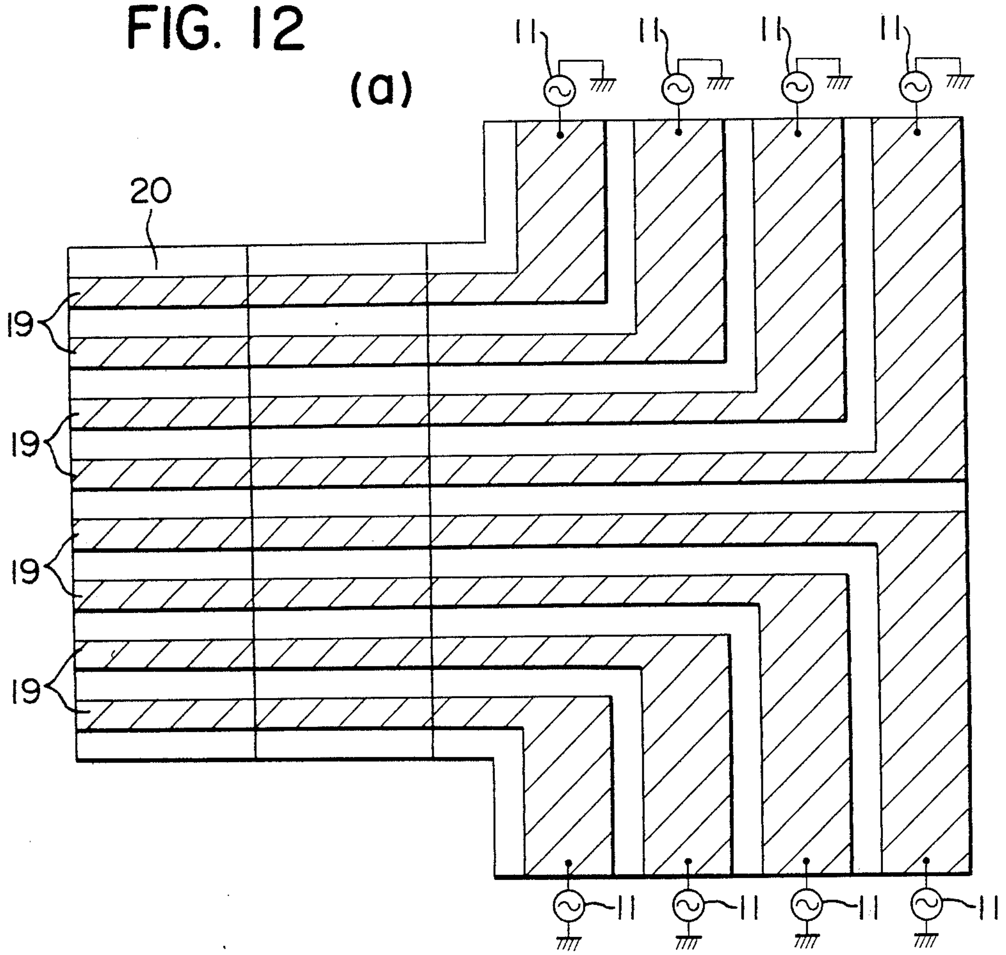
FIG. 12(*a*) is a top view of a lower plate of a tenth embodiment of the present invention.
Figure 12:
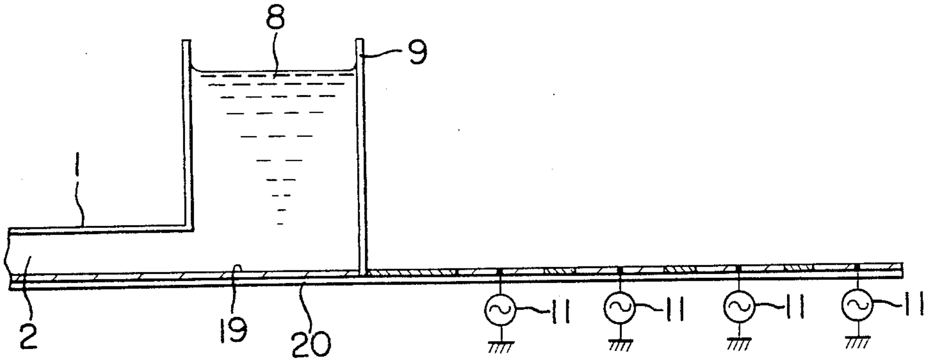

FIG. 12 shows a tenth embodiment of the present invention. The lower plate 20 of the ink head 1 is enlarged than the size of the ink head 1, and by the etching or printing method conductive wires 19 are formed from the portions corresponding to the issuing electrodes 4' to the lower plate 20 at the rear of the ink head 1.

Figure 13:
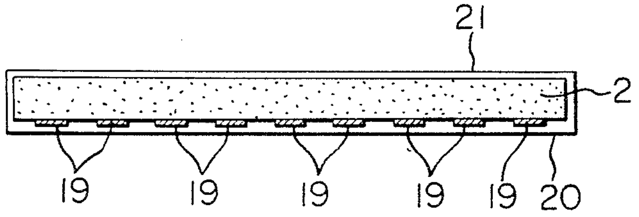
FIG. 13 is a front view of a slit-like ink issuing opening thereof.

One end of each conductive wire 19 terminating at the ink issuing opening 2 is used as the issuing electrode 4'. This etching method is similar to that used for fabricating the printed-circuit boards. That is, a copper foil or film deposited or otherwise formed on a base such as a glass or epoxy plate is etched to form a suitable pattern with an etchant such as ferrous chloride or the like. The method for printing an electrically conductive substance is such that a desired pattern of the conductive wires 19 is printed on an insulating base by the printing techniques. Both the etching and printing methods may accomplish the formations of high density patterns in a highly reliable and economical manner so that they are best suited for the ink recording head in accordance with the present invention. With the ink head having the construction described above, as a means for rendering the surface formed with the conductive wires 19 into a smooth surface as shown in FIG. 13, a method for filling an insulating filler between the electrodes is used. Alternatively, the smooth surface may be formed by heating and pressurizing the conductive wires 19 formed by the etching method or the application of a conductive material so as to inserting them into the insulating base 18.

With the ink head constructed in the manner described above, it is possible to form the ink drops whose particle sizes are uniform so that the quality of recorded images may be improved.

In the embodiments described above, the valving electrodes and the issuing electrodes are those for selecting the positions of the dots so that they are similar in function. Therefore they are all referred to as "the divided electrodes."

When a plurality of recording ink heads each having a slit-like issuing opening as described above are used and the ink in various colors are used, it is of course possible to obtain the recordings in multicolor or natural color.

What is claimed is:

1. A slit type ink recording apparatus comprising a head having a slit-like ink issuing opening in communication with an ink supply tank, a plate disposed adjacent said opening and parallel to the direction of ink travel therefrom, a plurality of divided electrodes formed on the surface of said plate in close proximity to said issuing opening, said divided electrodes being disposed in very closely spaced apart relationship, one or more opposite ink attracting electrodes disposed in the vicinity of a recording medium, and means for applying an ink attracting voltage between one or more of said divided electrodes and said opposite electrode, so that ink in said slit-like ink issuing opening may be issued from the vicinity of said selected divided electrode and caused to move toward said recording medium.

2. A slit type ink recording apparatus as set forth in claim 1 wherein two or more adjacent divided electrodes are not selected at the same time.

3. A slit type ink recording apparatus as set forth in claim 1 wherein said opposite electrode is formed with a slit through which the ink passes.

4. A slit type ink recording apparatus as set forth in claim 1 wherein there are provided a large number of projections which are extended from said slit-like ink issuing opening and have the width substantially equal to that of said divided electrodes.

5. A slit type ink recording apparatus as set forth in claim 4 wherein said projections are disposed at the upper and lower sides of said slit-like ink issuing opening.

6. A slit type ink recording apparatus as set forth in claim 1 wherein a material having little or no affinity with the ink is coated between said divided electrodes.

7. A slit type ink recording apparatus as set forth in claim 6 wherein a substance having no or less affinity with the ink is coated on the inside surface of said slit-like ink issuing opening in opposed relationship with said divided electrodes in said slit-like ink issuing opening.

8. A slit type ink recording apparatus as set forth in claim 1 wherein said opposite electrode is divided into a plurality of electrodes, each corresponding to each of the groups each consisting of a predetermined number of the divided electrodes.

9. A slit type ink recording apparatus as set forth in claim 8 wherein the divided electrodes each of which is selected from each of said groups are connected to a common high voltage driver, and one or more of the control drivers and one or more of said high voltage drivers are simultaneously selected.

10. A slit type ink recording apparatus as set forth in claim 1 wherein said divided electrodes are disposed on the inner surface of said slit-like issuing opening, each of a plurality of control electrodes disposed on the inner surface of said slit-like ink issuing opening in opposed relation with said divided electrodes corresponds each of groups each consisting of a predetermined number of said divided electrodes.

11. A slit type ink recording apparatus as set forth in claim 10 wherein each of said divided electrodes which is selected for each of said groups is connected to a common high voltage driver, and one or more of said control drivers and one or more of said high voltage drivers are selected simultaneously.

12. A slit type ink recording apparatus as set forth in claim 11 wherein a plurality of high voltage drivers are operated sequentially so as to sequentially apply a voltage to said divided electrodes, and said control electrodes are applied with a required voltage for each of the groups of said divided electrodes.

* * * * *

UNITED STATES PATENT OFFICE
CERTIFICATE OF CORRECTION

Patent No. 4,271,416 Dated June 2, 1981

Inventor(s) Toshio Shimizu, et al

It is certified that error appears in the above-identified patent and that said Letters Patent are hereby corrected as shown below:

Column 8, line 9: "no or less" should read --little or no--.

line 30: after "corresponds" insert --to--.

Signed and Sealed this

Fifth Day of January 1982

[SEAL]

Attest:

GERALD J. MOSSINGHOFF

Attesting Officer

Commissioner of Patents and Trademarks